(12) United States Patent
Margolus

(10) Patent No.: US 9,104,716 B2
(45) Date of Patent: Aug. 11, 2015

(54) HISTORY PRESERVATION IN A COMPUTER STORAGE SYSTEM

(75) Inventor: Norman H. Margolus, Somerville, MA (US)

(73) Assignee: Permabit, Inc., Cambridge, MA (US)

( * ) Notice: Subject to any disclaimer, the term of this patent is extended or adjusted under 35 U.S.C. 154(b) by 0 days.

(21) Appl. No.: 10/752,839

(22) Filed: Jan. 7, 2004

(65) Prior Publication Data

US 2004/0167902 A1  Aug. 26, 2004

Related U.S. Application Data

(63) Continuation of application No. 10/374,517, filed on Feb. 26, 2003.

(51) Int. Cl.
*G06F 7/00* (2006.01)
*G06F 17/00* (2006.01)
*G06F 17/30* (2006.01)

(52) U.S. Cl.
CPC .... *G06F 17/30368* (2013.01); *G06F 17/30082* (2013.01); *G06F 17/30085* (2013.01); *Y10S 707/99931* (2013.01); *Y10S 707/99936* (2013.01); *Y10S 707/99937* (2013.01); *Y10S 707/99939* (2013.01); *Y10S 707/99942* (2013.01); *Y10S 707/99952* (2013.01); *Y10S 707/99953* (2013.01)

(58) Field of Classification Search
CPC ...................... G06F 17/30085; G06F 17/30082
USPC ............... 707/3, 10, 100, 1, 9, 663, 662, 661; 709/226
See application file for complete search history.

(56) References Cited

U.S. PATENT DOCUMENTS

| | | | |
|---|---|---|---|
| 4,899,299 A | | 2/1990 | MacPhail |
| 5,107,419 A | * | 4/1992 | MacPhail ........................ 707/9 |
| RE34,954 E | | 5/1995 | Haber et al. |
| 5,579,501 A | | 11/1996 | Lipton et al. |
| 5,625,818 A | | 4/1997 | Zarmer et al. |
| 5,659,626 A | | 8/1997 | Ort et al. |
| 5,689,699 A | * | 11/1997 | Howell et al. ........................ 1/1 |
| 5,765,152 A | | 6/1998 | Erickson |

(Continued)

FOREIGN PATENT DOCUMENTS

| | | |
|---|---|---|
| EP | 0774715 | 5/1997 |
| WO | 99/09480 | 2/1999 |

(Continued)

OTHER PUBLICATIONS

Chaum et al., "Utraceable Electronic Cash", Advances in Cryptology CRYPTO '88, Springer-Verlag, pp. 319-327 (1998).

(Continued)

*Primary Examiner* — Usmaan Saeed
*Assistant Examiner* — Paul Kim
(74) *Attorney, Agent, or Firm* — Fish & Richardson P.C.

(57) ABSTRACT

A method by which a disk-based distributed data storage system is organized for protecting historical records of stored data entities. The method comprises recording distinct states of an entity, corresponding to different moments of time, as separate entity versions coexisting within the distributed data storage system, and assigning expiration times to the entity versions independently within each of a plurality of storage sites according to a shared set of rules, before which times deletion is prohibited.

24 Claims, 6 Drawing Sheets

| | event | time specified | no expiry counter | 1000 days counter | 100 days counter | scheduled expiration |
|---|---|---|---|---|---|---|
| 1) | block creation | 2003, day 47 | 0 | 0 | 0 | 2003, day 57 |
| 2) | add expiration | 2003, day 109 | 0 | 0 | 1 | 2003, day 147 |
| 3) | add expiration | 2003, day 140 | 0 | 0 | 2 | 2003, day 147 |
| 4) | add expiration | 2004, day 2 | 0 | 1 | 2 | 2005, day 318 |
| 5) | remove expiration | 2003, day 109 | 0 | 1 | 1 | 2005, day 318 |
| 6) | add expiration | 2007, day 21 | 1 | 1 | 1 | no expiration |
| 7) | remove expiration | 2007, day 21 | 0 | 1 | 1 | 2005, day 318 |
| 8) | remove expiration | 2004, day 2 | 0 | 0 | 1 | 2003, day 147 |
| 9) | becomes current | no expiration | 1 | 0 | 1 | no expiration |
| 10) | current superseded | 2003, day 79 | 0 | 0 | 2 | 2003, day 147 |
| 11) | add expiration | 2003, day 50 | 0 | 0 | 2 | 2003, day 147 |

(56) References Cited

U.S. PATENT DOCUMENTS

| | | | |
|---|---|---|---|
| 5,778,395 | A | 7/1998 | Whiting et al. |
| 5,787,247 | A | 7/1998 | Norin et al. |
| 5,813,009 | A * | 9/1998 | Johnson et al. ............... 707/100 |
| 5,819,295 | A | 10/1998 | Nakagawa et al. |
| 5,915,025 | A | 6/1999 | Taguchi et al. |
| 5,978,791 | A | 11/1999 | Farber et al. |
| 5,990,810 | A | 11/1999 | Williams |
| 6,023,706 | A | 2/2000 | Schmuck et al. |
| 6,125,371 | A | 9/2000 | Bohannon et al. |
| 6,205,533 | B1 | 3/2001 | Margolus |
| 6,209,000 | B1 | 3/2001 | Klein et al. |
| 6,314,435 | B1 | 11/2001 | Wollrath et al. |
| 6,529,995 | B1 | 3/2003 | Shepherd |
| 6,535,867 | B1 | 3/2003 | Waters |
| 6,584,466 | B1 * | 6/2003 | Serbinis et al. ................. 707/10 |
| 6,618,735 | B1 | 9/2003 | Krishnaswami et al. |
| 6,618,751 | B1 | 9/2003 | Challenger et al. |
| 6,801,999 | B1 | 10/2004 | Venkatesan et al. |
| 6,862,602 | B2 * | 3/2005 | Guha ............................ 707/101 |
| 6,928,442 | B2 | 8/2005 | Farber et al. |
| 6,952,737 | B1 | 10/2005 | Coates et al. |
| 6,971,018 | B1 | 11/2005 | Witt et al. |
| 7,054,867 | B2 | 5/2006 | Bosley et al. |
| 7,055,008 | B2 | 5/2006 | Niles et al. |
| 7,117,322 | B2 * | 10/2006 | Hochberg et al. ............. 711/160 |
| 2002/0038296 | A1 * | 3/2002 | Margolus et al. ................. 707/1 |
| 2002/0083178 | A1 * | 6/2002 | Brothers ...................... 709/226 |
| 2003/0004975 | A1 | 1/2003 | Nakano et al. |
| 2003/0028761 | A1 | 2/2003 | Platt |
| 2003/0105739 | A1 | 6/2003 | Essafi et al. |
| 2003/0220929 | A1 | 11/2003 | Tolpin et al. |
| 2006/0010150 | A1 | 1/2006 | Shaath et al. |

FOREIGN PATENT DOCUMENTS

| | | |
|---|---|---|
| WO | 01/18633 | 3/2001 |
| WO | 01/61563 | 8/2001 |

OTHER PUBLICATIONS

Feige et al., "Zero-Knowledge Proofs of Identity," Journal of Cryptology 1:77-94 (1988).

Margolus, Crystalline Computation, Chapter 18 of Feynman and Computation (A. Hey, ed.), Perseus Books, pp. 267-305 (1999).

National Institute of Standards and Technology, NIST FIPS PUB 180-1, "Secure Hash Standard", U.S. Department of Commerce (Apr. 1995).

Nowicki, "NFS: Network File System Protocol Specification" Network Working Group RFC1094, Sun Microsystems, Inc. (Mar. 1989).

Preface from FWKCS(TM) Contents_Signature System, Version 2.05, Copyright Frederick W. Kantor (Apr. 26, 1996).

Rabin, "Efficient Dispersal of Information for Security," Load Balancing, and Fault Tolerance, Journal of the ACM, vol. 36, No. 2, pp. 335-348 (Apr. 1989).

Rivest, "The MD4 Message Digest Algorithm," Network Working Group RFC1186, MIT Laboratory for Computer Science (Oct. 1990).

Muthitacharoen et al., "A Low-Bandwidth Network File System," Symposium on Operating Systems Principles, pp. 174-187 (2001).

Berners-Lee et al., "Universal Document Identifiers," available at http://www.webhistory.org/www-talk.1992/0032.html (Mar. 11, 1992).

Bowman et al., "Harvest: A Scalable, Customizable Discovery and Access System," Technical Report CU-CS-732-94, Dept. of Comp. Science, Univ. of Colorado (Aug. 1994).

Browne et al., "Location-Independent Naming for Virtual Distributed Software Respositories," available at www.netlib.org/utk/papers/lefn/main.html. (Nov. 11, 1994).

Kantor, FWKCS™ Contents_Signature Sytem, Version 1.18 (Sep. 11, 1992).

Heckel, "A Technique for Isolating Differences Between Files," Communications of the ACM, vol. 21, No. 4 (Apr. 1978).

Rabin, "Fingerprinting by Random Polynomials," Center for Research in Computing Technology, Harvard University, Technical Report TR-15-81 (1981).

Rivest, "The MD5 Message-Digest Algorithm," Network Working Group, Request for Comments: 1321, MIT Lab. for Comp. Science and RSA Data Security, Inc. (Apr. 1992).

Santry et al., "Deciding When to Forget in the Elephant File System," Symposium on Operating System Principal, pp. 110-123 (1999).

Sollins, "Functional Requirements for Uniform Resource Names," Network Working Group, Request for Comments: 1737, MIT Lab. for Comp. Science (Dec. 1994).

Williams, "An Introduction to Digest Algorithms," available at ftp.rocksoft.com:/pub/rocksoft/., (Sep. 1994).

* cited by examiner

| | event | time specified | no expiry counter | 1000 days counter | 100 days counter | scheduled expiration |
|---|---|---|---|---|---|---|
| 1) | block creation | 2003, day 47 | 0 | 0 | 0 | 2003, day 57 |
| 2) | add expiration | 2003, day 109 | 0 | 0 | 1 | 2003, day 147 |
| 3) | add expiration | 2003, day 140 | 0 | 0 | 2 | 2003, day 147 |
| 4) | add expiration | 2004, day 2 | 0 | 1 | 2 | 2005, day 318 |
| 5) | remove expiration | 2003, day 109 | 0 | 1 | 1 | 2005, day 318 |
| 6) | add expiration | 2007, day 21 | 1 | 1 | 1 | no expiration |
| 7) | remove expiration | 2007, day 21 | 0 | 1 | 1 | 2005, day 318 |
| 8) | remove expiration | 2004, day 2 | 0 | 0 | 1 | 2003, day 147 |
| 9) | becomes current | no expiration | 1 | 0 | 1 | no expiration |
| 10) | current superseded | 2003, day 79 | 0 | 0 | 2 | 2003, day 147 |
| 11) | add expiration | 2003, day 50 | 0 | 0 | 2 | 2003, day 147 |

FIG. 4

Event 3 Reference Message:

```
<policy> deletion requires namespace authorization </policy>
<expiration_time> 2003, day 140 </expiration_time>
<namespace_id> 10723 </namespace_id>
<location_hash> 1172325143219 </location_hash>
```

Event 9 Reference Message:

```
<policy>    if current at hour 0 of week, keep for a month;
            if current at hour 0 of month, keep forever  </policy>
<creation_time> 2003, day 49 </creation_time>
<expiration_time> no expiration (current) </expiration_time>
<namespace_id> 21031 </namespace_id>
<location_hash> 2210719210978 </location_hash>
```

After Event 11:

| | | |
|---|---|---|
| 100_day_counter | = | hash(Event 3 Reference Message) + hash(Event 9 Reference Message) |
| 1000_day_counter | = | 0 |
| no_expiry_counter | = | 0 |

FIG. 5

HISTORY PRESERVATION IN A COMPUTER STORAGE SYSTEM

CROSS-REFERENCE TO RELATED APPLICATIONS

This application is a continuation application of and claims priority to U.S. application Ser. No. 10/374,517, filed on Feb. 26, 2003.

TECHNICAL FIELD

The invention relates to storage systems for computers, and particularly to systems designed for long-term storage of data.

BACKGROUND

In disk-based storage systems, there is usually a clear separation between the primary storage function—which deals with providing rapid and efficient access to active data—and secondary storage mechanisms which deal with less active data, with long term data protection, and with maintaining archives of historical storage contents.

These secondary functions have, for the most part, traditionally been handled using magnetic tape storage. Reasons for this include the fact that tape has been much cheaper than disk storage (and other alternatives), and tape cartridges are easily transported to provide offsite copies of data to protect against loss due to localized disasters.

For a number of years, the cost per byte of disk hardware has been dropping at a much faster rate than that of tape hardware, making disk increasingly attractive as an alternative to tape as a medium for secondary storage. Some of the properties of disk, such as low-latency random access, clearly make it superior to tape as a secondary storage medium. If, however, the superior properties of disk are exploited in a secondary storage system, then new challenges arise which did not previously exist with tape.

For example, since every hard disk drive includes the mechanism for reading and writing the media that it contains, in a disk-based secondary storage system it becomes attractive to keep all data online at all times. This means that traditional mechanisms for protecting archival data, based on physically isolating and protecting the storage media, become inapplicable. One could simply turn the disks into write-once media by disallowing deletions in hardware, but then deletion of old data that are no longer needed would also be prohibited.

Moreover, for low cost safe disk storage it may be attractive to use an object storage scheme, such as is described in Margolus et al., "A Data Repository and Method for Promoting Network Storage of Data," U.S. 2002/0038296 A1 (Mar. 28, 2002). An object storage system is like a file system without a built-in mechanism for organizing the files ("objects") into a hierarchy. The clients of the object storage system must define and implement any such mechanism, for example by storing directory information in objects. This lack of built-in hierarchy separates out a complicated issue from the implementation of the storage system itself.

In the example of Margolus et al. U.S. 2002/0038296, security and privacy considerations are addressed by assuming that the storage system has little or no access to information about the structure or nature of the data that it stores. This constraint adds an extra dimension to the problem of safely allowing deletion of unnecessary data, while protecting necessary data from malicious or accidental deletion.

If deletion of unnecessary data is to be allowed, mechanisms are of course required for determining which data has become unnecessary. Traditional backup schemes maintain "snapshots" of storage system contents at predefined moments, discarding some snapshots as unnecessary after some period of time. File servers often use an on-disk snapshotting mechanism for short-term protection of files from data corruption or accidental deletion. Commonly, this is implemented by simply avoiding overwriting data that is needed for some existing snapshot, and instead writing the new data to a new location (and maintaining appropriate indexing information for finding the different versions of files). A snapshot, is created by declaring at some point in time that no data that exists at that point will be overwritten. A snapshot is discarded by freeing storage resources that are not needed by any other snapshot, and are not currently in use.

Thus one definition of unnecessary data is data that is only needed by discarded historical snapshots. The challenge of deleting only unnecessary data then requires reconciling this definition with the constraints and structure of a distributed, private and secure storage system. For example, it may not be possible, in general, for a storage server to determine which stored data is part of a given historical version, or even which historical versions exist. This problem is compounded if some pieces of data are shared: different historical versions of the same object, or even different objects, may all share common pieces of data, for storage efficiency. These pieces may only be deleted when they are no longer needed by any version of any object. Finally, there may be more sophisticated needs for the protection of historical information than are provided by simple snapshotting.

SUMMARY

In one aspect, the invention features a method by which a disk-based distributed data storage system is organized for protecting historical records of stored data entities. The method comprises recording distinct states of an entity, corresponding to different moments of time, as separate entity versions coexisting within the distributed data storage system, and assigning expiration times to the entity versions independently within each of a plurality of storage sites according to a shared set of rules, before which times deletion is prohibited.

Preferred implementations of this aspect of the invention may incorporate one or more of the following. The shared set of rules may require that unexpired entity versions not be changed. The storage system may be adapted for storing an unstructured-set of entities. The unstructured set may comprise more than a million entities, or more than a billion entities. The storage system may associate an entity with an identifier chosen by the storage client. The storage system may associate an entity version with an identifier that depends on a hash of its contents. A client of the distributed storage system may define mechanisms to organize the storage system into a hierarchical file system, with separately accessible entities playing the roles of files and directories. Expiration times of entity versions may be extended, and extension periods for different versions may be specified independently. An expiration time may be extended at the request of a client of the storage system. Information about the entity may be replicated to a plurality of storage sites, with the set of sites chosen based on a hash. Entity versions may be accessed separately, without needing to access a larger aggregate first. The plurality of storage sites may be located in different cities. No single individual may be allowed physical access to all of the plurality of storage sites. Administrative mechanisms may exist for overriding the deletion prohibition. No single individual may be given the authority to override the deletion prohibition at all of the plurality of storage sites. The versions of the entity may be assigned deposit times, and the version with the latest deposit time may be considered current. Non-current versions may be assigned expiration times. The deposit time may be specified by a client of the distributed storage system. The deposit time may be based on the time the deposit reaches a storage site. The deposit time may be constrained to agree with the actual time that the deposit reaches a storage site, to within predetermined limits. The actual time may be determined by clocks at the storage site, operating without reference to an external time standard. The actual time may be determined by clocks at the storage site, with a limit to a total correction applied per fixed period using an external time standard. No constraint may be imposed if the deposit time specified by the client is earlier than the latest deposit time, of any existing version of the entity. The entity may be used to record the history of a file in a source file system, and an historical version of the file may be added from a separate record of the file system's history with a deposit time that precedes the most current version of the entity. The imposition of the constraint may begin at a predefined event, before which event versions of the entity may be deposited with deposit times that violate the constraint. The predefined event may be the deposit of a version of the entity with a deposit time specified that agrees with the actual time, to within predetermined limits. The predefined event may be a request from a storage client to begin monitoring deposit times for the entity. A client of the distributed storage system may deposit records of a source file system's history into the storage system, with entities corresponding to files and directories, and the deposit times specified for versions of entities may correspond to times associated with the records. Two distinct entities, each of which holds records of the content of a file in the source file system during different time intervals, may be linked within a third entity. The third entity may be associated with a directory in the source file system. The expiration time assigned to a non-current version may depend on when it was superseded as the current version. The expiration time assigned to the non-current version may depend on the deposit time that was assigned to it when it was current. The expiration time assigned to the non-current version may depend on the deposit time assigned to the version that superseded it as the current version. The expiration time assigned to the non-current version may depend on the actual time when it was superseded as the current version. The storage client may supply information that allows the storage system to associate a version with the version that it supersedes as the current version. The information supplied by the storage client may allow the storage system to order the versions of the entity by deposit time. The expiration time may depend on the length of the time interval during which the version was current. The expiration time may depend upon which defined snapshot moments the version was current during. The expiration time may depend on the deposit times of non-current versions of the entity. A version may be deposited, and the expiration time for it may be set by the storage client. A version may be deposited, and a time interval during which it is presumed to have been current may be assigned by the storage client. The expiration time may depend on the time interval during which a version is presumed to have been current. A plurality of versions of a first entity which are deposited during a time interval may all have their expiration times extended to at least a first expiration time. A second entity which records hierarchical directory information including that of the first entity may have a version deposited during the time interval which expires earlier than the first expiration time. Summary information may be stored in a version of the second entity that does not expire before the first expiration time, that is sufficient to recreate hierarchical directory information of the version that does. A version may make reference to constituent blocks of stored content, with each block assigned a reference count which reflects the number of references there are to the block in any version. The version may be deleted by a storage client, the reference counts assigned to its constituent blocks of stored content may be decremented, and a block with reference count of zero may be discarded and its storage space may be reused. Versions may make reference to constituent blocks of stored content, with each block assigned a reference count which reflects the number of references there are to the block in current versions. Each block may also be assigned an expiration time that depends on the latest of expiration times associated with versions which make reference to it. A block which has a reference count of zero and an expiration time which has passed may be discarded, and its storage space may be reused. The reference counts for blocks of stored content may be incremented when the blocks are deposited. The expiration time for a block of stored content may be set to a default non-zero value when the block is deposited. Entities may be associated with entity version records, with each entity version record storing the association between an entity identifier freely chosen by a storage client and the versions of the entity. Each entity version record may be assigned a reference count which reflects the number of references there are to the corresponding entity from within current entity versions. Each entity version record may also be assigned an expiration time that depends on the latest of all of the expiration times associated with the versions of the entity recorded in the version record. An entity version record with reference count of zero and an expiration time which has passed may be discarded and the storage space may be reused. The expiration time for an entity version record may be set to a default non-zero value when it is created. The blocks of stored content may be strings of bytes with a predetermined maximum length. A block may be referenced using a block name which depends upon a hash of the content of the block. The block content may be encrypted using a key derived from its unencrypted content.

In another aspect, the invention features a method by which a disk-based distributed data storage system is organized for protecting historical records of stored data entities. The method comprises recording distinct states of an entity, corresponding to different moments of time, as separate entity versions coexisting within the distributed data storage system, associating time-intervals with entity versions, corresponding to the times during which each entity version was considered current, sharing a set of rules for retaining entity versions among a plurality of storage sites, and designating some entity versions as deletable and some as undeletable independently at each of the plurality of storage sites.

Preferred implementations of this aspect may incorporate one or more of the following. Except for deletion, entity versions may be immutable. Expiration times may also be assigned to some entity versions, independently within each of the plurality of storage sites, according to a shared set of rules, before which times deletion may be prohibited. No single individual may be given the authority to override the deletion prohibition at all of the plurality of storage sites.

In another aspect, the invention features a method by which a disk-based data storage system is organized for protecting historical records of stored data entities. The method comprises recording distinct states of an entity, corresponding to different moments of time, as separate entity versions coexisting within the data storage system, assigning expiration times to the entity versions, before which times deletion is prohibited, and assigning expiration times to blocks of stored content that constitute the entity versions, with at least one block shared between different entities.

Preferred implementations of this aspect of the invention may incorporate one or more of the following. The data storage system may be distributed and the expiration times may be assigned independently within each of a plurality of storage sites according to a shared set of rules. The expiration time assigned to a block may reflect the latest of the expiration times associated with a plurality of versions which make reference to it. A block may be assigned a reference count which reflects the number of references there are to the block in a plurality of versions which are not scheduled to expire. A block may be assigned a reference count which reflects the number of references there are to the block in a plurality of versions which are scheduled to expire during some specified finite time period. The block may also be assigned a default expiration time that depends on a time of origin associated with the block itself. The default expiration time may depend upon the expiration times assigned to each of a plurality of versions which make reference to the block. A block with a reference count of zero and a default expiration time which has passed may be discarded and its storage space may be reused. An authorized storage client may cause a block to be discarded which has a default expiration time which has not yet passed. An authorized storage client may cause a version to be deleted for which the assigned expiration time has not yet passed. A block referenced by the deleted version may be discarded and its storage space may be reused.

In another aspect, the invention features a method for keeping track of when all references of a specified category made to elements have been removed. The method is designed to fail in a manner that does not falsely conclude there are no references. The method comprises computing a hash value that identifies the source of a reference, combining hash values using a first operation to record the addition of references, combining hash values using a second operation to record the removal of references, and concluding that reference additions for an element have been matched by reference removals.

Preferred implementations of this aspect of the invention may incorporate one or more of the following. The hash may be a cryptographic hash. The first operation may include counting the number of reference additions. The first operation may include adding together hashes. The first operation may include adding corresponding bits of hashes together modulo 2. The hash value uniquely may identify the reference source. Additional information not needed to identify the reference source may be included in the identifying hash. Hash values may be combined at a physical location that is separated from a source of references. The additional information may be examined at the location where the hash values are combined, and a decision may be made to not combine a hash value. The additional information may be examined at the location where the hash values are combined, and determines which categories of combined hash will be affected. A reference-removal operation may be performed on one category of combined hash and a reference-addition operation may be performed on another. Reference sources and combined hashes may be distributed among a collection of computers. The computers may be servers in a disk-based data storage system. The data storage system may be organized for protecting historical records of stored data entities. Distinct states of an entity may be recorded, corresponding to different moments of time, as separate entity versions coexisting within the data storage system. Expiration times may be assigned to the entity versions, before which times deletion is prohibited. Expiration times may be assigned according to a shared set of rules. Expiration times may be assigned to blocks of stored content that constitute the entity versions. A hash value may identify the reference of an entity version to a block that is shared with other entities. Information about the shared set of rules may be included in the reference-identifying hash. Information that allows the general deletion prohibition to be ignored may be included in the reference-identifying hash. Reference additions to the shared block may have been matched by reference removals, and the shared block may be discarded and its storage space may be reused.

In another aspect, the invention features a method by which more than one client program connected to a network stores the same data item on a storage device of a data repository connected to the network. The method comprises encrypting the data item using a key derived from the content of the data item, determining a digital fingerprint of the data item, storing the data item on the storage device at a location or locations associated with the digital fingerprint, and assigning an expiration time to the data item, before which time deletion is prohibited.

Preferred implementations of this aspect of the invention may incorporate one or more of the following. Rules governing expiration and deletion may be distributed among a plurality of storage sites. The expiration time assigned to the data item may depend upon expiration times assigned by the client programs.

In another aspect, the invention features a method by which more than one client program connected to a network stores the same data item on a storage device of a data repository connected to the network. The method comprises determining a digital fingerprint of the data item, testing for whether the data item is already stored in the repository by comparing the digital fingerprint of the data item to the digital fingerprints of data items already in storage in the repository, challenging a client that is attempting to deposit a data item already stored in the repository, to ascertain that the client has the full data item, and assigning an expiration time to the data item, before which time deletion is prohibited.

Preferred implementations of this aspect of the invention may incorporate one or more of the following. Rules governing expiration and deletion may be distributed among a plurality of storage sites. The expiration time assigned to the data item may depend upon expiration times assigned by the client programs.

In another aspect, the invention features a method by which more than one client program connected to a network stores the same data item on a storage device of a data repository connected to the network. The method comprises determining a digital fingerprint of the data item, storing the data item on the storage device at a location or locations associated with the digital fingerprint, associating the data item with each of a plurality of access-authorization credentials, each of which is uniquely associated with an access owner, assigning an expiration time to the data item, before which time deletion is prohibited, and preparing a digital time stamp of a plurality of records associating data-items and credentials, to allow a property of these records to be proven at a later date.

Preferred implementations of this aspect of the invention may incorporate one or more of the following. Rules governing expiration and deletion may be distributed among a plurality of storage sites. The expiration time assigned to the data item may depend upon expiration times assigned by the client programs.

In another aspect, the invention features a method by which more than one client connected to a network stores the same data item on a storage device of a data repository connected to the network. The method comprising determining a digital fingerprint of the data item, testing for whether a data item is already stored in the repository by comparing the digital fingerprint of the data item to the digital fingerprints of data items already in storage in the repository, associating with a data item an informational tag which may be read by at least some client programs, and assigning an expiration time to the tagged data item, before which time deletion is prohibited.

Preferred implementations of this aspect of the invention may incorporate one or more of the following. Rules governing expiration and deletion may be distributed among a plurality of storage sites. The expiration time assigned to the tagged data item may depend upon expiration times assigned by the client programs.

In another aspect, the invention features a method by which a client connected to a data repository over a lower speed network connection may provide higher speed access to a data item for application processing than is possible over the relatively low speed connection to the network, the method comprising determining a digital fingerprint of the data item, testing for whether the data item is already stored in a repository by comparing the digital fingerprint of the data item to digital fingerprints of data items already in the repository, only if the data item is not already in the repository, transferring the data item over the lower speed connection from the client to the repository, assigning an expiration time to the data item, before which time deletion is prohibited, making a higher speed connection between an application server and the data repository, executing an application on the application server to process the data item stored on the data repository, and returning at least some of the processed data to the client across the lower speed connection.

Preferred implementations of this aspect of the invention may incorporate one or more of the following. Rules governing expiration and deletion may be distributed among a plurality of storage sites. The expiration time assigned to the data item may depend upon expiration times assigned by the client programs.

In another aspect, the invention features a method by which multiple clients browse content on a network such as the Internet. The method comprises each of the multiple clients accessing content on the network via one or more proxy servers, determining the digital fingerprint of an item of content passing through the proxy server, storing the item of content in a content repository connected to the proxy server at a location associated with the digital fingerprint, assigning an expiration time to the item of content, before which time deletion is prohibited, testing for whether a content data item is already stored in the repository by comparing the digital fingerprint of the content data item to the digital fingerprints of content data items already in storage in the repository, and associating a content data item already stored in the repository with an access authorization credential uniquely associated with an access owner.

Preferred implementations of this aspect of the invention may incorporate one or more of the following. Rules governing expiration and deletion may be distributed among a plurality of storage sites. The expiration time assigned to the item of content may depend upon expiration times assigned by the multiple clients.

In another aspect, the invention features a method by which clients store content items which are broken into up into smaller data items in a data repository connected to the network. The method comprises determining a digital fingerprint of a data item, testing for whether a data item is already stored in the repository by comparing the digital fingerprint of the data item to the digital fingerprints of data items already in storage in the repository, and assigning an expiration time to a data item, before which time deletion is prohibited.

Preferred implementations of this aspect of the invention may incorporate one or more of the following. Rules governing expiration and deletion may be distributed among a plurality of storage sites. The expiration time assigned to the data item may depend upon expiration times assigned by the multiple clients. The expiration times assigned to data items that comprise a content item may depend upon an expiration time assigned to the content item. The content item may be broken up in a manner that is independent of the content. The content item may be broken up in a manner that depends on the content type. The content item may be broken up at boundaries defined by predetermined byte strings. The choice of which byte strings constitute boundaries may depend upon the value of a hash function acting on the byte strings.

In another aspect, the invention features a method for ensuring that rules that prevent premature deletion of entity versions are enforced by correctly operating servers that store the blocks of content that comprise the entity versions. The method comprises computing a hash value that identifies the source of a reference to a block of content, incorporating into the hash value a description of rules or parameters that are needed in order to enforce rules, and communicating information which allows the hash value to be computed, to a server that stores the block of content.

Preferred implementations of this aspect of the invention may incorporate one or more of the following. The hash may be a cryptographic hash. The hash value may uniquely identify the reference source. A block of content may be identified by a digital fingerprint that involves a hash of its content. A block of content may be assigned an expiration time, before which time deletion may be prohibited. The blocks of content may be distributed among a plurality of storage sites. An expiration time assigned to an entity version may also be assigned to each of its constituent blocks of content. The information which allows the hash value to be computed may be included in a request to delete the block of stored content. A server storing the block of content may deny a request that violates a rule or parameter specified in the information supplied when the block was created. Distinct states of an entity may be recorded, corresponding to different moments of time, as separate entity versions coexisting within a data storage system. The rules governing deletion of an entity version may depend upon when the entity version was created. Hash values that identify references to blocks of stored content may be combined as part of a reference counting scheme. Some reference counts may be associated with expiration times, and their values may be ignored after some point in time. The connection between an entity version and a constituent block of content may not be visible to a server storing the block of content. The stored block of content may expire and the server storing it may discard it and may reuse its storage space. The information supplied by the storage client that associates a version with a superseded version may be discarded while the two versions are retained.

In another aspect, the invention features a method by which a distributed disk-based data storage system is organized for protecting historical records of stored data entities. The method comprises recording distinct states of an entity, corresponding to different moments of time, as separate entity versions coexisting within the data storage system, assigning expiration times to the entity versions, before which times deletion is prohibited, assigning expiration times to blocks of stored content that constitute the entity versions; and assigning a reference count to a block of stored content that reflects the number of references there are to the block in entity versions which are scheduled to expire during some specified finite time period.

Preferred implementations of this aspect of the invention may incorporate one or more of the following. The block may also be assigned a reference count that reflects the number of references there are to the block which are not scheduled to expire. The block may also be assigned a default expiration time which sets an earliest time that the block can expire, even if all expiration related reference counts are zero. The data storage system may be distributed and the expiration times may be assigned independently within each of a plurality of storage sites according to a shared set of rules. An authorized storage client may cause a block to be discarded and its space may be reused when its expiration time has not yet passed. An authorized storage client may override the deletion prohibition and may cause an entity version to be deleted when its expiration time has not yet passed. A block of stored content referenced by the deleted version may be discarded and its storage space may be reused.

In another aspect, the invention features a method by which a disk-based data storage system is organized for protecting historical records of stored data entities. The method comprises recording distinct states of an entity, corresponding to different moments of time, as separate entity versions coexisting within the data storage system, and assigning finite expiration times to entity versions based on information supplied by the storage client, before which times deletion is prohibited and after which times deletion is allowed.

Preferred implementations of this aspect of the invention may incorporate one or more of the following. A version may be deposited, and the expiration time for it may be set by the storage client. A version may be deposited, and a time interval during which it is presumed to have been current may be assigned by the storage client. The expiration time may be assigned by a storage server and may depend on the time interval during which a version is presumed to have been current. The entity may be used to record the history of a file in a source file system, and an historical version of the file may be added from a separate record of the file system's history. The added historical version may have an interval during which it is presumed to be current specified that predates that of an existing version of the entity. Expiration times of entity versions may be extended, and extension periods for different versions may be specified independently. Unexpired entity versions may not be changed. The storage system may be adapted for storing an unstructured-set of entities. The connection between an entity version and a constituent block of content may not be visible to a server storing the block of content. A plurality of versions of a first entity which are deposited during a time interval may all have their expiration times extended to at least a first expiration time. A second entity which records hierarchical directory information including that of the first entity may have a version deposited during the time interval which expires earlier than the first expiration time. Summary information may be stored in a version of the second entity that does not expire before the first expiration time, that is sufficient to recreate hierarchical directory information of the version that does. Versions may make reference to constituent blocks of stored content, with each block assigned a reference count. Each block may also be assigned an expiration time that depends on the latest of expiration times associated with versions which make reference to it. A block which has a reference count of zero and an expiration time which has passed may be discarded, and its storage space may be reused.

Other features and advantages of the invention will be apparent from the drawings, detailed description, and claims.

DESCRIPTION OF DRAWINGS

FIG. 4 shows an example history of expiration times for a datablock. The block is first deposited on day 47 of 2003, its expiration time changes as versions referencing it are deposited and deleted, and finally the block expires and is discarded on day 147 of 2003.

FIG. 5 shows an example of additional information that might be communicated when object versions that references the datablock of FIG. 4 are added or removed. The reference counts in FIG. 4 are replaced with sums of hash values that depend on this additional information.

DETAILED DESCRIPTION

Figure 1:
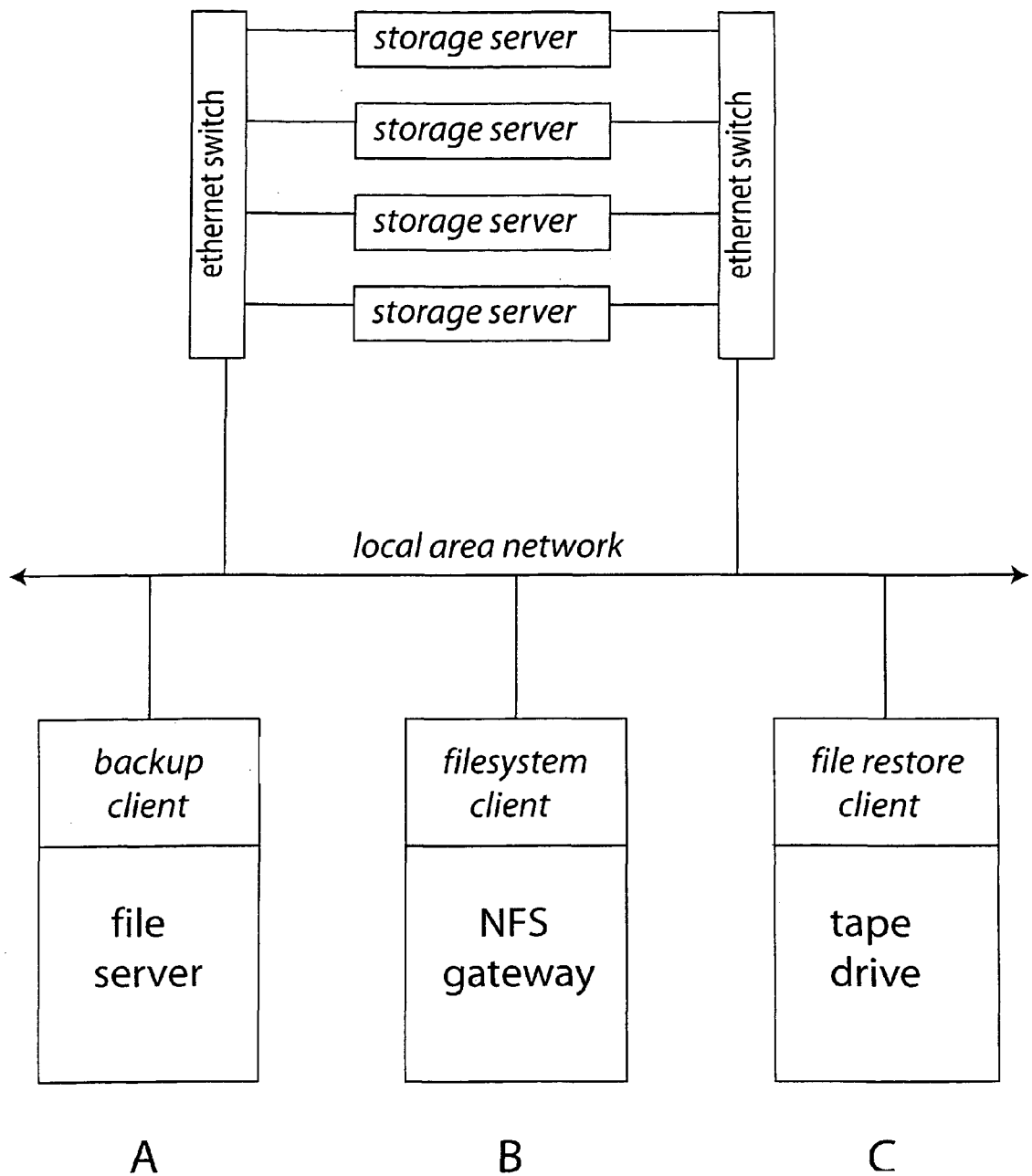
FIG. 1 is a block diagram showing a storage clique (storage site) consisting of four storage servers, connected to some backup clients over a local area network.

There are a great many different implementations and embodiments of the invention possible, too many to possibly describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

GLOSSARY OF TERMS

The definitions below reflect the usage of some of the terms used in this document.

Clique: A cluster of servers at a single storage site.

Coalescence: The merging of datablocks with the same dataname.

Collision: The accidental agreement of hashes of distinct data.

Content Hash: Cryptographic hash of the contents of a datablock.

Continuous History: A complete record of current and historical versions.

Cryptographic Hash: A hash designed to never have collisions.

Currency Interval: The interval during which a version was current.

Current Version: The object version with the latest deposit time.

Datablock: A string of bytes of bounded size.

Dataname: Content hash of a datablock, used as its unique identifier.

Deposit: The process of sending data to the object storage system.

Directory Object: An object used to record file hierarchy information.

Directory Version: A version of a directory object, current or historical.

Expiration Time: A time after which deletion is allowed.

Gateway: An application server acting as a storage system client.

Hash: A psuedo-random map from a byte string to a fixed-length value.

Historical Version: An object version that is not the current version.

Metablock: Storage server representation of an object, specifically a record linking an object identifier to a version list.

Namespace: A related set of object identifiers.

Object: A collection of object versions named by an object identifier.

Object Identifier: A client-specified identifier for an object.

Object Storage System: A system for storing unstructured sets of objects.

Object Version: A set of byte strings, e.g., a set of datablocks.

Policy: A version retention policy.

Reference Count: A count of the number of references to an entity.

Replica: A redundant copy of a block of data, used for data protection.

Scalable: Able to be increased in size and capacity indefinitely.

Self-Backing: Storage that does not require external backup.

Self-Encrypted: Encrypted in a key that depends on the unencrypted data.

Self-Named Data: Data named by a content hash of the data.

Server: A storage server.

Snapshot: A set of object versions that were current at a specified moment.

Snapshot Policy: A policy that assigns expiration times to snapshots.

Stable Version: A version which remains current for a relatively long time.

Stable Version Policy: A policy that retains stable versions.

Storage Server: A dedicated computer that provides storage services.

Storage Site: A place where a portion of the storage system is located.

Version: An object version.

Version List: A list of versions that make up an object.

Version Retention Policy: A shared set of rules used by storage servers to govern when versions can be deleted.

Version Thinning: The process of deleting versions that have expired.

INTRODUCTION

Figure 2:
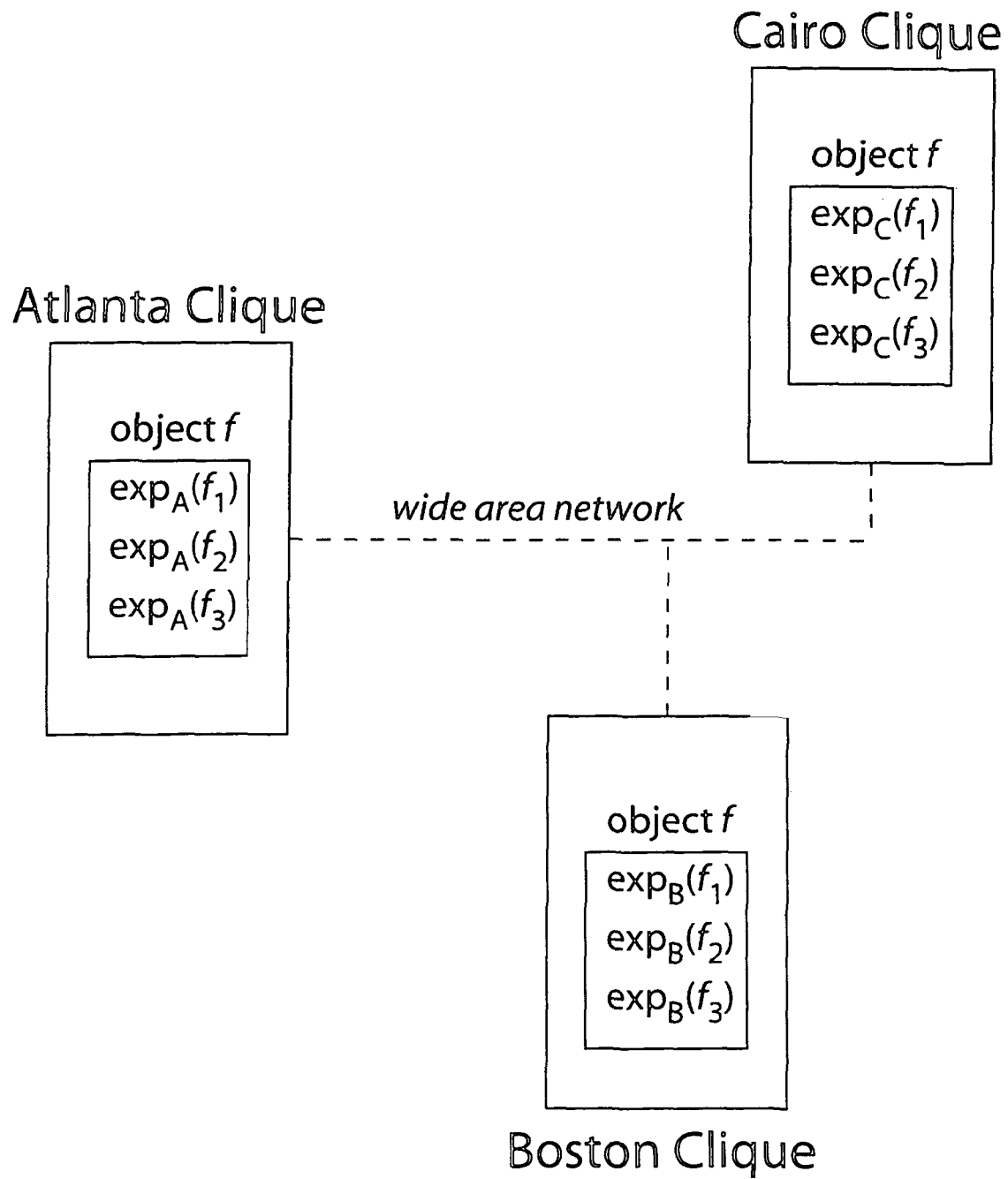
FIG. 2 is a block diagram showing three storage sites of an object storage system, one in Atlanta, one in Boston, and one in Cairo. Each of the sites has independently assigned expiration times to three versions of object f.

FIG. 1 shows a system diagram of one storage site (storage clique) consisting of several storage servers of an object storage system. FIG. 2 shows several such sites connected together over a wide area network, linked together as parts of a geographically distributed storage system. FIG. 1 also shows a selection of storage clients, each of which communicate with the storage clique using a defined object storage system protocol.

Client A is a file server running a backup program, which allows changed file and directory information on the file server to be stored as new versions of objects in the storage system, with each file and directory corresponding to a distinct object, and each object having multiple versions, corresponding to distinct historical states of the objects. Client B is an NFS gateway, which presents the file system information stored by client A (including historical information) as a read-only file system using the NFS file sharing protocols. Client C is a tape server, which talks to a tape drive.

The example storage system of FIGS. 1 and 2 is an elaboration of the one described in Margolus et al., U.S. 2002/0038296 A1. The overall storage system is comprised of a collection of geographically separated storage centers called "cliques," each of which is comprised of one or more "storage servers," which in turn are comprised of one or more processors and storage devices. Some of the desirable properties of the preferred embodiment of the object storage system are:

(1) Fault Tolerance. The system is composed of a number of servers and a number of cliques, and there are no single points of hardware failure. Data is stored redundantly. If some predetermined maximum number of servers are removed from a clique, no data is lost within that clique. If a predetermined number of cliques are removed from the system, no data that has had time to be communicated to other cliques is lost. Geographic separation makes it unlikely that a disaster affecting one clique will damage another.

(2) Hash-Based Data Names. Datablocks (called data items in Margolus et al. U.S. 2002/0038296 A1) are strings of bytes with a predetermined maximum size that are the basic unit of content. A cryptographic hash of the contents of a datablock, called a dataname, is used to name the datablock in the system, to locate the datablock within the system, and to test whether a new datablock being deposited already exists within the system, and hence can be communicated and stored by reference, without transmitting or storing the actual bytes of the datablock.

(3) Self Encryption. Datablocks may be stored in an encrypted form. If the encryption key is derived from the unencrypted contents of the datablock, then different storage clients will independently turn the same unencrypted block into the same encrypted block, and so security can be achieved while still avoiding the need to transmit and store the same information repeatedly.

(4) Objects and Versions. The storage system associates an object identifier, chosen by a storage client, with stored data. Each object can include many object versions of the stored data, each of which is identified by its deposit time. An object version references some set of constituent datablocks using their datanames. Many object versions may reference the same datablock.

In addition to protecting data against server faults and clique destruction, the storage system is designed to allow recovery from accidental or malicious deletion or corruption. The primary mechanism for achieving this is based on the notion of object history. Storage clients define and name data objects which change their contents with time, but not their names. Each named object may include multiple versions, the latest of which is the "current version;" the rest are "historical versions." In case a client deletes or corrupts the current version, the preservation of some number of historical versions allows recovery. Historical versions may also have archival value.

Version Retention

In a distributed object storage system, robustness against physical damage to individual cliques comes from redundancy across well-separated cliques. This same property of geographic separation, together with abstraction barriers that isolate the internal operation of cliques from outside control, provides an effective avenue for protecting object history. A shared set of rules governing which object versions must be retained, and for how long, are enforced independently within each clique: this independent enforcement of a version retention policy makes it impossible for any accidental or malicious act that is mediated by one clique to cause any other correctly operating clique to delete any data that is not determined by the policy to be deletable. Care must also be taken that ordinary storage system operators and administrators have no special privileges or physical access that let them globally circumvent or change these policies.

Useful version retention policies can be based on how long a version remains current. At the moment when a new version is written, the time interval during which the superseded version was current becomes apparent: the version was current from the time it was created until the moment it was superseded (or deleted). For this time interval information to be visible to the storage servers, it must be the case that a new version is created by referencing the current version. This would not be the case, for example, in a storage system in which new versions are completely independent objects as far as the storage servers are concerned, and their linkage to existing objects is only visible to the storage client.

Of course, the connection between different object versions does not have to be continuously apparent to the storage system: the linkage between apparently independent objects in the storage system could be indicated by the storage client at the moment when a new version is being written. At that moment, an object version marked "current" could be changed to "historical" (and an expiration assigned), while a new object version marked "current" could be created.

Since the storage client needs a mechanism for accessing object history in order to be able to "roll back the clock" to a an earlier state, and since aggregating information that associates object versions reduces the number of entities that the storage system must manage, it makes sense for the system to have a form of "object metadata" that links the various object versions together, and to the object identifier. This is called a metablock, and it provides access to a list of versions that includes dataname references to the actual datablocks that constitute the versions. If the version-list provides the only link between versions, then if the version list is encrypted between accesses using key information provided by the storage client at access time, and this key information is not stored, then the linkage between versions is not normally visible to storage servers. A metablock is only one example of how an object with multiple versions may be represented in a computer system.

At the moment a version is superseded, an expiration time can be assigned to it based on the time interval during which it was current (and perhaps other factors). Historical versions are then kept safe by the server policy of not allowing unexpired versions to be deleted. As long as servers constrain historical-version expiration based on the time interval during which the version was current, storage clients cannot subvert this mechanism. A malicious system administrator with wide sweeping file access privileges could conceivably delete all of the current files to which he has access, but this would define the end of the current time-interval of all of those formerly current versions, and they would be assigned expiration times by the servers which he could not hasten. Earlier historical versions that had not expired would also be protected. Even if a malicious agent was able to gain total control of a storage clique at one location, it would have no power to delete the redundant information about unexpired versions stored at other locations, or hasten their expiration.

Expiration assignment is illustrated in FIG. 2. Three cliques are shown in three different cities. Some of the version list information or an object f that is represented at each of these three storage sites is shown in the illustration. For each of three versions, f1, f2 and f3, each of the three cliques independently computes expiration times and stores them in the version list, during a period when the version list is accessible. Each clique independently prohibits deletion of unexpired versions.

Note that, as long as the expiration time assigned to a version depends on the time interval during which the version was current, the moment when the version is superseded must be determined (or at least monitored) by the clique. If this time was specified solely by the storage client, then a malicious client could subvert the protection mechanism by specifying old deposit times for new versions, thus making long-lived current versions appear ephemeral (and hence they would not be protected). If the replacement time is determined independently by the clique, or at least monitored by the clique to be in reasonable agreement with actual time, then this problem does not arise.

This mechanism requires a dependable time standard. There is clearly a danger that any external time standard used by a clique might be compromised, resulting in incorrect and unsafe behavior. One way to deal with this is to have each clique act as its own time standard: once its clocks are set during system startup (or restart), they compare themselves only with each other. It would also be relatively safe to let the clique use an external time standard as long as the clique refuses to change its clocks by very much in the course of a day. This prevents a malicious agent from doing much damage by manipulating the time standard.

Note also that minimum guarantees of persistence of history are not endangered by allowing storage clients to delay the expiration of historical versions of objects, or make them permanent.

Snapshot Retention

One useful version retention policy is based on the idea of file system snapshots discussed earlier. An understandable and useful retention policy is to simply guarantee access to a complete snapshot of all objects belonging to a given storage client at specified snapshot moments, with each snapshot guaranteed to persist for a specified period of time.

This kind of policy is similar to conventional practice with the retention of backup tapes. For example, if the snapshot moments are chosen to occur every day at some fixed time, then these snapshots correspond to daily full tape backups. If some daily snapshots are kept only for a week, while others are kept for a month or a year or made permanent, then this policy provides the same level of recoverability from client deletion or corruption of current data as conventional tape backup.

Retaining snapshots does not involve actively making copies of object versions. It is only as a new object version is written that it must be determined how long to keep the previous version, in order to retain the information needed for reconstructing historical snapshots. For each current version, as it is superseded, it is apparent exactly which "daily backups" its time interval of currency covered, and if each of these backups has an expiration associated with it, then the expiration assigned to the version at this moment is simply the latest of all of these.

Figure 3:
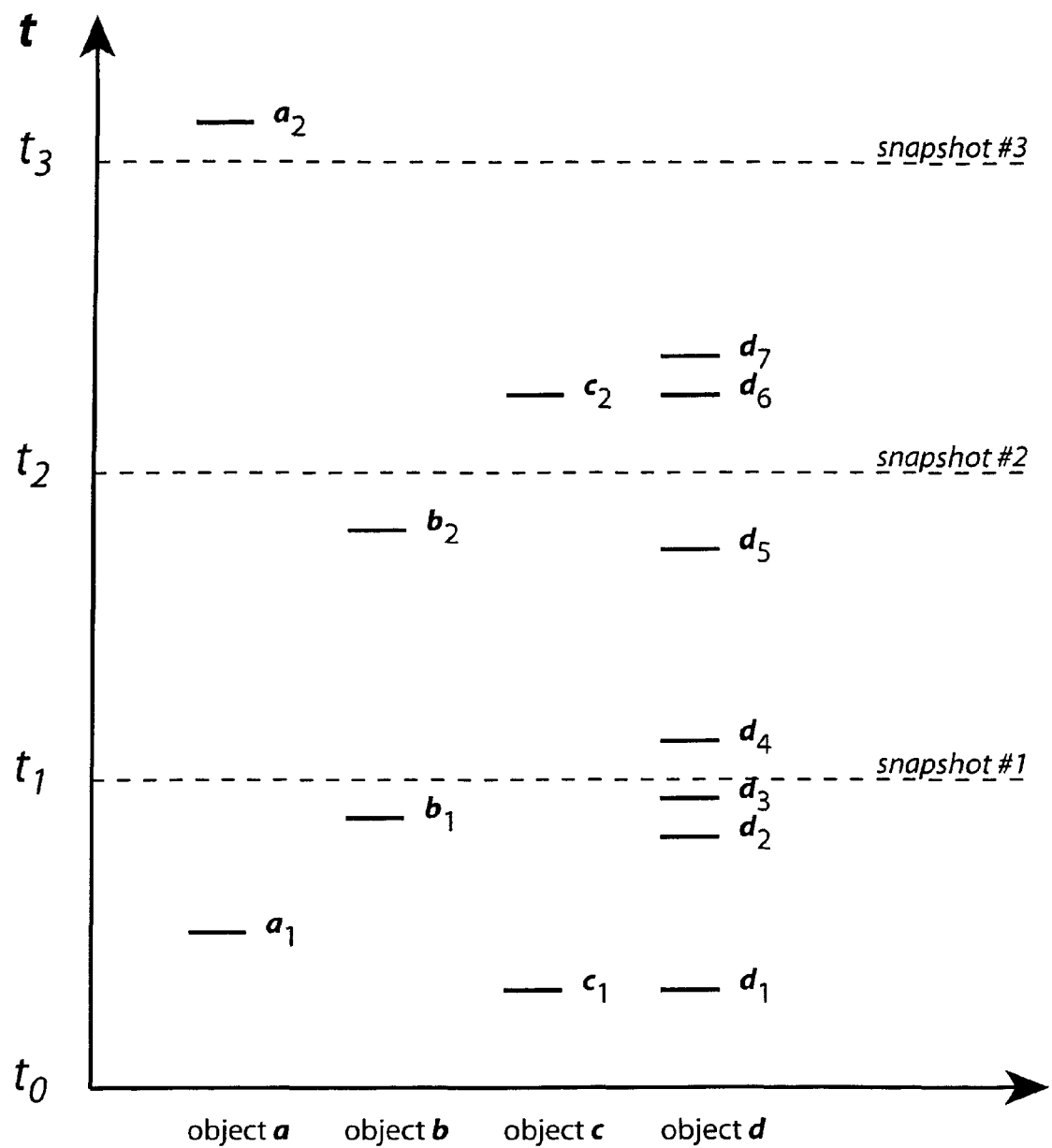
FIG. 3 is a block diagram showing four objects (a, b, c and d) with new versions deposited at the indicated times. Three snapshot moments are defined, at times t1, t2 and t3.

The relationship of versions and snapshots is illustrated in FIG. 3. Three snapshot moments are defined, at t1, t2 and t3, and four objects are shown, a, b, c and d. Well assume for the sake of illustration that to is the beginning of the operation of the object store, and nothing changes after the times illustrated. Object a is created and then does not change until after t3, and so version a1 remains current for all three snapshots. For object b, version b1 is current for snapshot 1, and version b2 is current thereafter. For object d, only three of its versions (d3, d5 and d7) are current at snapshot moments. If were following a snapshotting version retention policy, then the rest of the versions of d can be deleted as soon as they are superseded. If snapshot 1 items get an expiration of a day, snapshot 2 a week, and snapshot 3 a month, then a1 lasts a month (measured from t3), c1 lasts a week (starting from t2) and b1 lasts a day (starting from t1). If nothing changes after the times illustrated, then versions a2, b2, c2 and d7 will remain current indefinitely, and so are not subject to expiration.

Notice that a snapshot has both a time at which it is taken and an expiration period. E.g., a snapshot may be taken every day, but some have expiration periods of a day, others a week, and still others a month.

Note that if the object storage system is being used for protecting a record of data that is actively used on some other "primary" storage system (i.e., backup), then as long as changes to the primary storage system are eventually copied into the object store, each changed file version (for example) will appear as the current object version during some set of snapshot moments, and will be protected accordingly.

Adding History

Traditional full backup of disk storage results in snapshots on tape media. These have the problem that they have a finite lifetime, not only because the tapes degrade with time, but also because the media become obsolete and it becomes difficult to find or maintain hardware that can read old tapes. Thus in cases where tape backup is being displaced by versioned object storage, it may be desirable to be able to transfer old backup-tape snapshots into the object storage system, to allow the tape media to be retired (see client C in FIG. 1). This may be done long after an object storage system has taken over the role of directly backing up a primary storage system (e.g., client A in FIG. 1).

One way to add history to an existing object storage system is to have storage clients directly write historical versions of existing objects. The current time-intervals associated with these versions are known at deposit time and so expiration times can be either assigned to them by the storage system or specified explicitly by the storage client as they are written. It is natural, for example, to add full-backups of a file system in this manner, and the backup snapshots can be added in any order. Allowing extra historical versions to be directly added does not affect the protection afforded by the expiration times assigned to existing historical versions.

Another way to deal with this is to add the history using a set of objects distinct from any existing objects. This has the advantage that incremental backup tapes recorded from a file system can be loaded in historical order to create a full snapshot from each incremental tape, as each successive tape defines new current versions. If the dates associated with the data on the tapes are assigned to the creation and replacement times for versions, then the object storage system can determine the current time-intervals associated with those versions by itself, and hence assign expiration times automatically, according to set policy.

Allowing the operation of "deposit with an old date" does not interfere with the protection afforded object versions which are not being added in from historical records, as long as only current versions which were deposited with a significantly out-of-date deposit time can be superseded with one. This rule prevents, for example, a current version which was deposited, a year ago with an up-to-date deposit time from being replaced now with a current version with a deposit time of one second later If all incremental tape-history of a source file system is added before any new history is added (i.e., before one begins to back up the current state of the source file system directly into the object storage system), then the same objects can be used for both the tape-history and the continuing backup. If, on the other hand, old history from incremental tapes is to be deposited after new history has already begun to be accumulated by direct backup into the storage system, then the two sets of objects can be explicitly linked, to make all of the history conveniently accessible to the storage clients. This can be done, for example, by recording the association in appropriate root directory objects.

Continuous History

If, for some set of objects, no versions deposited during some time period are deleted, then any moment of the history of that set of objects during that period can be reconstructed. The reconstruction consists of the set of object versions that were current at the given moment during that period. For example, if a file system is stored in the object storage system and no versions of files or directories are deleted for the first hour that they exist, then any moment of history for the most recent hour can be reconstructed as a snapshot.

Both continuous history and discrete snapshots can be combined. For example, if the finest-grained discrete-snapshot interval is hourly, then object versions that change more often than that would normally be overwritten, rather than have historical versions kept. If the storage client simply extends the expiration time of all object versions to be at least one hour after the moment they are superseded as the current version, then all versions of all objects for the most recent hour will be available. Thereafter, snapshots will be available according to the predetermined version retention policy, unless expirations are explicitly extended. If, as another example, all current object versions superseded during some particular hour are extended to a month, then continuous history will be available for that particular hour, for a month.

If the storage client is using the object store directly as a file system and recording file system directory information in ordinary objects deposited in the object store, then there may be a very large number of directory versions retained to allow this kind of continuous history reconstruction. This can be greatly reduced by being selective about which versions of directories have their expirations extended, and by including extra transaction-log information in the retained directory versions that allows the deleted versions to be reconstructed.

For example, the client might only keep directory versions when client-defined directory metadata changes (e.g., permissions of who is allowed to access the directory). Each retained version is associated with a start time and an end time for the period summarized by the version; a record of the ending contents of the directory; and a transaction log, including the timing, of all file additions, deletions, file renamings and file movements between directories that have affected this directory during this time period. This allows any intermediate version of the directory to be recreated, without keeping explicit versions.

The interaction of summary directories with a snapshotting policy can be illustrated with reference to FIG. 3. Suppose that the interval from t0 to t3 is three hours, divided into three equal intervals in the picture. Suppose also that continuous history is being kept for one hour, that object d is a directory, and that d's directory metadata does not change during the interval t0 to t3. This means that, except for the extra directory versions (d3 and d5) that are automatically retained at the snapshot moments, and the current version (d7), all other directory versions written during the period shown can be deleted as soon as they are superseded. Each directory version contains a summary of the past hour, up to that version, and in particular version d7 allows a reconstruction of directory contents of versions d4 through d7, d5 can reconstruct d1 through d5, and d3 can reconstruct d1 through d3. To reconstruct a moment midway between snapshots 1 and 2, the directory contents of version d4 is reconstructed from the directory contents and transaction log of the next available directory version (d5), and a1, b1 and c1 are part of the reconstructed moment. The extension of the expirations of the non-current versions a1, b1 and c1 to a minimum of one hour can be requested by the client as they are superseded, with only the expirations associated with the discrete snapshot moments set by the clique.

To reconstruct a discrete snapshot moment long after the continuous history has expired, no intermediate directory versions need to be reconstructed. Since no directory version will be deleted which was current at any discrete snapshot moment that is still being retained, directories for snapshot moments will always be available. Only the ending contents, recorded in the directory version current at the snapshot moment, is needed.

Eventually, some of the retained directory versions will expire and may be deleted. Because of the log-start and log-end times associated with the continuous history directory versions, it will always be clear which intervals of directory history can still be reconstructed with the available information.

Manual Version Thinning

One scheme for protecting version history while still allowing unnecessary versions to be deleted (and the corresponding unneeded storage to be reclaimed) is to leave the protection up to the servers, and the deletion up to the clients.

In this scheme, each datablock has a reference count associated with it. The reference count reflects how many times the block appears as part of any version, historical or current. Current versions are assigned an expiration time by the storage server when they are superseded, according to a predetermined retention policy. Expirations can be extended by storage clients. Expired versions can be deleted by a storage system client, but no other versions are allowed to be deleted. Thus necessary versions are protected from deletion by the storage-server-enforced "retain until expired" policy, but deletion becomes the responsibility of the storage client.

When an expired version is deleted, the reference counts of all of its constituent datablocks are appropriately decremented by the storage server. A datablock may be deleted from storage, and its space reclaimed, if its reference count is zero. Note that all reference count decrementing can be performed by the storage server at the moment when the client explicitly deletes an expired version, and so version metadata may be encrypted in between times, using a key provided by the storage client that the storage server uses transiently and does not retain.

This manual scheme has the drawback that it is necessary for the storage client to periodically access all of its objects in order to delete unneeded versions. It is also difficult to turn into an automatic server-side scheme. For example, one could imagine having the storage servers delete any expired versions any time an object is accessed. This would work fine for ordinary files, but not for directory objects, which would have to be marked as special and handled directly by storage clients—since the server can not see inside them. If a directory version were automatically deleted by a storage server, objects that were only referenced by that version would become unreachable by the storage client, which could never access them again, and so the storage server would never reclaim their space. Both of these problems are fixed by the automatic scheme outlined in the next section.

Automatic Version and Datablock Deletion

As long as all storage servers in the object storage system agree on the algorithm for determining the expiration time of a version when it is superseded as current, then both the version and all of the datablocks that comprise it can be assigned this expiration time. If the expiration time of a version is extended, each datablock that it references can be assigned the extended expiration time. If a datablock is referenced by several versions, its expiration time becomes the latest of all of the expiration times assigned to it as part of each version. It is thus guaranteed that a datablock will not expire until all of the non-current versions that it is part of have also expired. If the datablock is not part of any current versions, then when it expires it is safe to delete it. Otherwise it must not be deleted. Thus it is important to know whether a datablock is part of any current versions. Therefore each datablock has associated with it both an expiration date, determined by the latest expiring version it is part of, and a current-reference count, determined by how many current versions it is part of. A datablock may be deleted if it is not part of any current versions (i.e., its current-reference count equals zero) and it is not part of any unexpired historical version (i.e., its expiration time has passed).

Using this scheme, space can be reclaimed automatically by the storage servers as soon as versions expire, even if an object is never accessed again. Furthermore, it makes no difference whether the versions affected are directories or not. All file and directory versions current at a snapshot moment are kept at least until that snapshot expires. File and directory versions that were not current during any unexpired snapshot are not needed, and datablocks referenced only by them can be deleted. For example, in FIG. 3, if snapshot 1 has expired, then the datablocks referenced only by b1 are no longer needed. Those referenced by b2 are still current (assuming nothing changes after time t3). If some datablock is referenced by b1 and c1 and by no other version, it will not expire until snapshot 2 expires.

If there are current versions of files or directories that are not reachable from the root of the file system, then these files will never be superseded and their datablocks will-never be released. This situation will never arise, however, as long as the file system is kept consistent and children are deleted before their parent directories are.

Note that, when datablocks are first deposited in the storage system and before they have become part of any object version, it may be convenient to guarantee that they persist for some minimum period. Thus datablocks may be deposited with a non-zero expiration time. This has the effect of extending the minimum persistence, but it does not hinder the ultimate reclamation of storage space. Alternatively, the current-reference count may be incremented when the datablock is deposited (or redeposited, in the case of shared datablocks). This avoids the need for a burst of reference-count increments when the version referencing the datablock is deposited. Provisions can be made, if deemed necessary, to decrement reference counts in the atypical case where the associated version is never deposited.

Note also that the "expiration plus current count" mechanism for controlling the deletion of datablocks depends only on access to version information at the moment when a current version is superseded. No access to this information is needed at any other time, and so this is consistent with a privacy mechanism that does not allow any access to version information or the composition of versions except while a new object version is actually being written.

For example, suppose that for each object, the version list which describes which datablocks comprise each version is stored by the storage servers in an encrypted form, using an encryption key which clients give to the storage servers only at the moment that the version is accessed. If the storage servers do not store this key, then this information is unavailable at any other time, thus improving the privacy of the storage system. This brief window of visibility is, however, sufficient to allow the storage servers to assign expiration times to datablocks, and to adjust current-reference counts for datablocks. If this process occurs independently within each storage clique, then non-current "backup" versions and their associated datablocks will obey the retention constraints imposed by preset retention policies: backup data is safe, but unneeded datablocks are server-visibly marked as being deletable, and may be automatically deleted.

As another example, suppose that there is no encryption being used, but that some datablocks are encoded using an erasure correcting code which is very space efficient and loss resistant, but which requires a lot of work to recreate the original data. In this case, it is data safety rather than security that makes it difficult to access some version and directory information. No such access is needed, however, to allow non-current datablocks to expire and be deleted.

Automatic Metablock Deletion

The mechanism outlined in the previous section allows all datablocks that are referenced only by expired historical versions to be deleted and their space reclaimed. A similar mechanism can be used to allow deletion of metablocks for objects that contain only expired versions, while protecting unexpired history. In this scheme, a metablock has a current-reference count and an expiration time, just like a datablock. We'll call the current-reference count a "link count," and allow the storage client to directly control this count. The expiration time, however, will be governed by the clique.

Whenever a reference to an object appears in a new directory version which did not appear in the previous version, the storage client requests that the clique increment the link count associated with that object's metablock. Similarly, when a reference disappears from a current directory, the storage client asks the clique to decrement the link count. Meanwhile, whenever a new version of the object is written, or the expiration time of any version is made later, the clique adjusts the expiration time associated with the object's metablock to be the later of the existing expiration and the new one.

When a metablock's link count reaches zero, then (according to the storage clients) there are no current directories that reference this object—it has been deleted. The clique updates the expiration time associated with the metablock, since the current version has been superseded and given an expiration time. At this point the object has no current version. When the expiration time associated with the metablock has also passed, the object has no unexpired versions either. At this point the metablock (and its associated version list) can be deleted, and the space associated with them reclaimed.

This scheme also addresses a problem that may occur when an object is first created with block information but no version list. If no version of the object is written within some reasonable period (e.g., a month), the object can be presumed to be an orphan and deleted. A default expiration time for the metablock can be used to accomplish this.

Overriding Version Retention Policy

An administrative mechanism is provided to allow an authorized client to delete non-current versions before they have expired, and to reclaim space freed by this action. Unauthorized clients are not permitted to delete unexpired versions.

To support this mechanism, datablock expirations are stored in a manner that allows expirations that have been assigned to a datablock to later be undone, with the expiration reverting to the latest expiration time assigned which has not been unassigned. This is made easier by the fact that datablock expirations can be stored with low resolution: space doesn't need to be freed instantly when the last version that references a datablock is deleted. For example, suppose that all datablocks expire either 10 days, 100 days or 1000 days after they are first created, or never. This expiration information can be represented using two additional reference counts per datablock, to give a total of three.

In this example, the first reference count, which has been discussed earlier, is used to represent version-references to the datablock which do not expire. These include references from current versions, references from versions which are marked as "permanent," and references from versions which have an expiration of greater than 1000 days after the creation time of the datablock—these references are "rounded up" to permanent. The second reference count is used to represent version-references which are between 100 and 1000 days after the creation time of the datablock. The third reference count represents references between 10 and 100 days after the creation time.

If all three counts are zero, the datablock expires 10 days after its creation time. If the first two counts are zero but not the third, the datablock expires 100 days after its creation. If the first count is zero but not the second, the block expires after 1000 days. If the first count is non-zero, the datablock doesn't expire at all. When a version is deleted, the expiration time of the version is included in a "decrement request" applied to each of its constituent datablocks. One of the three reference counts may be decremented, depending on the difference between the version expiration time and the block creation time. Similarly, if a new non-current version is written, its expiration time is included in an "increment request" applied to each of its constituent datablocks. To change the expiration time of a version, its datablocks are first incremented using the new expiration time, and then decremented using the old.

A sample history of expiration times for a datablock is given in FIG. 4. In the example, the datablock is first created on day 47 of 2003. All three expiration counters are initially zero, and so the datablock is scheduled to expire 10 days after its creation. In event 2, a version is added which references this datablock, and which expires on day 109 of 2003. This is rounded up to 100 days after the datablock creation, and the third counter is incremented. A version that expires on day 140 of 2003 increments the same counter. In event 5, the version that was added in event 2 is deleted, and the version reference is removed. The 100 day counter is decremented, and the datablock expiration time is determined by the highest order non-zero count. In event 9, a current version is added which references this datablock. In event 10, this version becomes non-current and is assigned an expiration. In event 11, a version is added which expires on day 50 of 2003. None of the counters is incremented since it expires less than 10 days after datablock creation. If no further version references to this datablock are added or deleted after event 11, then the datablock expires on day 147 of 2003 and may be discarded and its space reused anytime thereafter.

If two independent copies of a datablock are created and later merged, the creation time of the later-created block is assigned to the merged block—this associates an expiration time with each count. The expiration times associated with the earlier-created block's counts are "rounded up" to determine which counts to add together. A simple algorithm is to just add together corresponding counts. A subsequent decrement may then end up being applied to a lower-order count than the corresponding earlier increment, but this will never free a block early.

Clients may be administratively authorized to delete individual versions that expire up to some distance in the future. Deleting versions will result in the decrementing of datablock reference counts. The resulting state of the counts will indicate when each datablock will expire, or if it has already expired. Clients may also be administratively authorized to globally delete versions that expire up to some distance in the future. This results in the expiration time of all datablocks in the storage system being reinterpreted, with those that fall within the global deletion interval being considered already expired, and available to be discarded and reused. For example, such a client might declare all versions that expire within the next week to be already expired. For a snapshot retention policy, this means that all snapshots that expire within a week are instantly deleted, and their space reclaimed.

For increased data safety, it may be desirable to distinguish between versions that are not scheduled to expire because they have been marked to be kept permanently, and versions which are not scheduled to expire because they are current, and so their expiration is yet to be determined. In the former case, normal clients should never be able to affect the corresponding datablock reference counts, whereas in the latter case they should. If the requirement for adequate authorization extends all the way to the datablock level, then references for these two kinds of cases can be accumulated separately. Alternatively, hash-based reference counting can be used.

Reference Counting with Hashes

Cryptographic hashing can be used to implement a form of reference counting in which version retention policies are enforced both at the version and at the datablock level. No matter how the datablocks are distributed across storage sites, each site containing a datablock independently enforces the version retention policies relevant to that block. Cryptographic reference counting prevents malfunctioning or compromised servers from instructing correctly operating servers to prematurely delete datablocks. This protection depends on the property of a cryptographic hash as a "digital fingerprint" which uniquely identifies a message.

In cryptographic reference counting, all information that the server storing the datablock needs to enforce the retention policy is communicated with each increment or decrement request. The server computes a cryptographic hash of this information and this value is added or subtracted from a reference count hash total. When the hash total reaches zero, the reference count is zero. Otherwise, the reference count is known only to be non-zero. The use of cryptographic hashes prevents any other server from deleting information by lying about the relevant enforcement information: the information specified with the decrement must always agree with that specified with the increment, or the hash total will never reach zero.

For non-current versions, the relevant enforcement-information includes the version expiration time, the namespace_id, and sufficient information to uniquely locate the datablock within an object version (handle, version id, etc.). For decrement requests, the expiration time and namespace_id are specified separately, along with a single hash of all the other information. This allows the storage server holding the datablock to determine which expiration count should be affected, and to check whether the namespace_id has been authorized to delete a version with this expiration. If per-object authorization is desired, the handle can also be specified separately. For increment requests, the expiration time along with the hash to be added to the hash-total can simply be specified, since no checking is needed for increments.

For datablocks referenced by current versions, each increment request must—in addition to information needed to locate the datablock within an object version—specify the retention policy and the creation time associated with the version being created. This information will be hashed and added to the hash-total. When a decrement request is sent, it must include this same information, and this will be used to calculate the hash needed to decrement the current-reference hash-total, and to calculate an expiration time. If an expiration time is explicitly included in the decrement-current request, the later of the calculated and the specified times will be used to determine which datablock expiration count to increment.

The use of cryptographic reference counts is illustrated in FIG. 5. In this example we have assumed that the reference count increments and decrements in FIG. 4 have been replaced with cryptographic hash values. In event 3, for example, a message specifying a policy, an expiration time, a namespace identifier and a location hash is sent with the increment request, and a hash of this message is added to the 100-days counter, instead of incrementing it by one. Similarly, in event 9 a message is sent with the increment request which specifies that this is a reference from a current version, when the version was created, and what policy should be used to assign an expiration when the version becomes non-current. We assume that at event 10, the current version from event 9 has been current at hour 0 of a week, but not at hour 0 of a month, and so it is assigned an expiration time of 30 days from its creation. All of the information specified in the increment must be supplied at the decrement or the storage server holding the datablock will not compute the same hash that was added to the no-expiry counter in event 9, and so the no-expiry counter will remain non-zero.

Note that with this scheme, it is not necessary to use separate hash-totals for current-version references and for references from versions that are permanent.

Other Version Retention Policies

Version retention policies other than those discussed above are useful. For example, one can keep the N most stable versions of each object (i.e., the ones that were current the longest), rather than the versions that happen to be current at snapshot moments. This is an example of a non-snapshot policy that protects history, since a malicious or buggy storage client cannot affect how long historical entity versions were current. In contrast, a policy of keeping the N most recent versions would not protect history, since history could be erased by simply depositing N empty versions.

Figure 6:
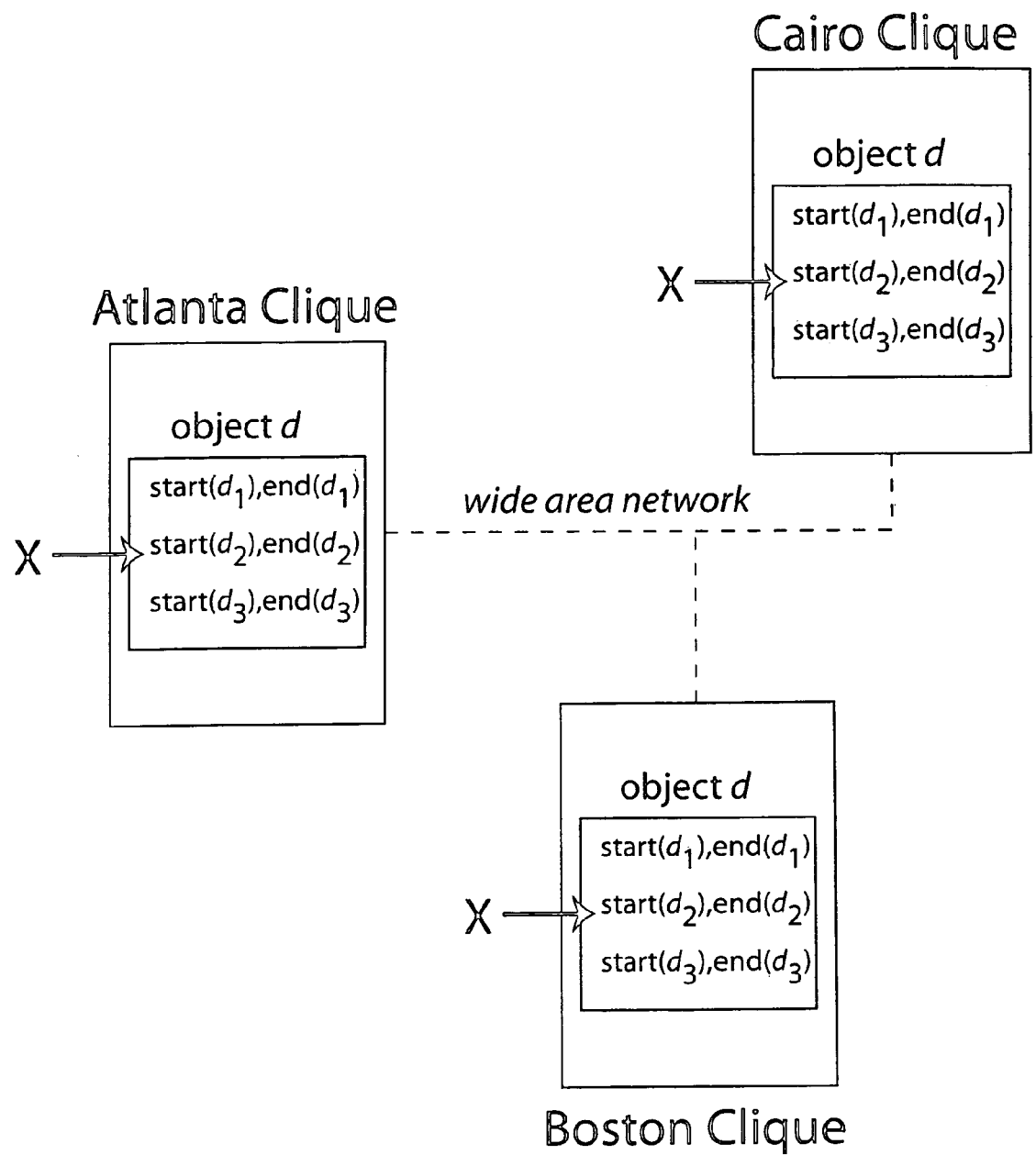
FIG. 6 is a block diagram showing three storage sites of an object storage system, one in Atlanta, one in Boston, and one in Cairo. Each of the sites has independently marked the least stable version of d for deletion.

Enforcing an "N most stable" policy requires the storage system to have access to information about when each version of a stored entity was current. Currency-intervals are recorded for all versions, and the storage system looks at this information in applying the "N most stable" policy independently at each storage site, refusing to delete versions protected by the shared policy. This is illustrated in FIGS. 3 and 6. Suppose the policy is to keep the current version and up to two historical versions of each object, based on stability, with no snapshot policy in force. At the point when d4 is deposited in FIG. 3, one of d1, d2 or d3 must be deleted. Since d2 was current for the shortest interval, it will be deleted. In FIG. 6, we see d2 being independently selected for deletion at each storage site, based on a record of the interval during which each version was current.

Versions and datablocks can be automatically deleted by the object storage system when using a most-stable policy. This fits within the same reference count framework used for snapshot based datablock management. In this case, all versions protected by a most-stable policy have indefinite lifetimes, just as current versions do under a snapshotting policy. Thus a datablock's "no expiration scheduled" reference count reflects how many references there are to the datablock in current or stable versions—only this count is affected by versions protected by a most-stable policy. When there exist N object versions for which the most stable N versions are retained, the addition of a new version results in the automatic deletion of an old version. The no-expiry reference counts of all datablocks that are part of the deleted version are decremented. As usual, any datablock with a no-expiry reference count of zero and which has expired may have its storage space reused.

The overall policy on prohibition of deletions can involve the union of several different prohibitions, based separately on expirations, stability, and other factors; or on these factors considered jointly. For example, the policy for an object could be to keep the two most stable historical versions, in addition to any versions required by a snapshot-based policy. In this case, up to two historical versions of each object have indefinite expirations. If a current version is superseded and it has lasted longer than one of two existing stable versions, then it becomes one of the two stable versions. The version it replaces is assigned an expiration time based on the snapshotting policy, which looks at the interval during which it was current and any expiration explicitly assigned to it. For example, in FIG. 3, suppose versions current at t1 are considered part of snapshot 1 and are given an expiration of a day; and in addition the two most stable historical versions are kept. Then when d5 is deposited, d4 replaces d3 as one of the two most stable versions, and d3 is given an expiration of a day. Datablocks that are part of current or stable versions have this fact reflected in their no-expiry reference counts alone, whereas datablocks that are part of non-current snapshot versions may have this fact reflected in other expiration information.

OTHER EMBODIMENTS

One aspect of the invention that is illustrated by the preferred embodiment is that of protecting history by using a coordinated system of deposit-time-dependent expiration policies that are independently enforced at separate storage locations. This idea can be applied rather generally. It could apply equally well to file systems that are aware of the nature and structure of stored data and to object storage systems that have little or no such access. It can be applied to systems adapted mainly for seldom-changing archival data, or to systems designed for high-performance read-write access.

In preferred implementations, the storage system is made aware that a new item is being stored that should be considered the replacement for an existing item. It is not necessary that the storage system know which item is replacing the existing item, only that the replacement is taking place and what is being replaced. This could be indicated by telling the system at deposit time that a deposited item replaces an existing item as a "current" version, or even by an entirely separate operation in which the storage system is informed that an existing item is no longer current, and an expiration time should be assigned to it. Thus items could be, in general, created as "current" with a deposit time, and at some later time marked as "historical", at which point the storage system assigns it an expiration time. Some items could also be deposited already marked as "historical", with an expiration (or an assumed interval of currency from which the storage system can infer an expiration) specified by the storage client. Expiration times could be assigned by storage clients to both current and historical versions, and the effective expiration would always be the latest of all assigned expirations. For example, a version might be marked as "permanent" (infinite expiration) while it is still current, and this expiration would persist even after it is no longer current. As another example, a version might be given an expiration of a week while current, and the expiration assigned to it by policy when it becomes historical might be a month, which would override the shorter expiration.

When the distributed storage system is backing up some other kind of source storage system, there are many different ways in which the source information can be mapped into storage entities. For example, each file and directory of a file system might be mapped into a separately named and separately accessible object, or an entire snapshot might be mapped into a hierarchical tree of self-named datablocks which refer to each other using content based datanames, or some combination of these two approaches might be taken. An entire backup record might even be stored as a single string of bytes, with different versions corresponding to different backup records. Directories might contain version summary information or not. Additional history of the source storage system could be added from tapes or from non-tape media. Many different source storage systems could be backed up into the same distributed storage system. If desired, encryption can be used to keep backup data private.

Deposit time information can be determined and monitored in many ways. The important thing is to do something which makes it difficult for an antagonist to manipulate this information. If system monitoring of deposit time accuracy for specific objects or sets of objects is inconvenient when history is initially being deposited, it could be turned off at object creation, and only turned on later. As long as monitoring cannot easily be turned back off, protection of history is provided.

The method used in the preferred embodiment to allow authorized users to override retention policy and recover storage space is quite general. The same method is useful even with just a single reference count associated with each datablock, with expiration occurring only for blocks that have a zero count, and happening a fixed time after block creation (or block merger). For fine control, a large number of counts could be used. The time-range associated with each of the expiration time counters could be different for different datablocks, and could change with time, as long as at each transition old expiration periods are rounded up when they are converted to new ones. The expiration time associated with a block that has all reference counts of zero does not have to be fixed globally for all blocks, but could be recorded separately for each block, or for sets of blocks, and could be changed with time (with normally authorized clients perhaps allowed to increase it). It could even depend on the expiration times of object versions that reference the block which expire during some time interval.

Retention and deletion policies that apply to object versions are preferably inherited by the datablocks that constitute the object versions: the rules that apply to datablocks must be consistent with the rules that apply to the object versions that reference them. For example, the expiration time of a datablock must be no earlier than that of any object version that includes it as a component. This basic property may be achieved rather generally, by having a storage server that holds an object version share the relevant rules—along with any information needed to implement them—with the servers that hold the datablocks the object version references. This sharing occurs when the object version is created and new references to datablocks are added, so that the rules governing the removal of these references are safely established.

The preferred embodiment uses a technique of cryptographic reference counting to ensure that the same information is conveyed to a storage server when a reference to a datablock is removed as was conveyed when the reference was added—thus making this information available without placing the burden on the storage server to retain this information. This takes advantage of the property of a cryptographic hash as a unique fingerprint associated with a particular message. This technique prevents incorrect information in a decrement request from ever generating the same hash that was computed when the corresponding increment was performed. This technique can clearly be used to govern any kind of distributed reference counting, where accidental or malicious decrements must be guarded against. A related technique, which provides less protection, is to associate a short non-cryptographic hash with each conventional reference count, with the hash used in the same manner as the cryptographic hashes discussed. Both the conventional count and the associated hash must be zero for the count to be considered to have a value of zero. This guards against many causes of accidental deletion due to bugs in the software, but not against malicious attacks: short hashes don't prevent the falsification of messages. Reference counts with hashes are also useful even when datablocks aren't shared, since they match add-block and delete-block requests, and also ensure that any policy and background information governing the deletion is available, or no deletion will occur.

The description of preferred embodiments did not depend on how object versions are broken up into constituent datablocks. This can been done in a content-independent manner (e.g., fixed length segments), or based on content or even meta-information (such as file type). For example, email messages might be broken up at attachment boundaries, to increase the number of shared datablocks. Object versions may even be broken up at a set of byte-strings chosen pseudo-randomly, as is done for example in the file system discussed by Athicha Muthitacharoen, Benjie Chen and David Mazieres in their paper, "A Low-Bandwidth Network File System", that appeared in 2001 in "Symposium on Operating Systems Principles," pages 174-187.

It is to be understood that the foregoing description is intended to illustrate a few possible implementations of the invention. These and a great many other implementations are within the scope of the appended claims.

What is claimed is:

1. A data storage system in which a plurality of client programs running on processors connected to a communications network share space on storage hardware used to store a data item in a data repository that uses processors at a plurality of storage sites connected to the communications network to enforce retention requirements governing the data item, the data storage system comprising one or more processors configured for:

determining a digital fingerprint from the content of the data item using a hash function;
  storing the data item on storage hardware at the plurality of storage sites of the data repository, in response to a request from a first client program to deposit the data item in the data repository;
  ensuring that the data item is stored on storage hardware in the data repository, in response to a request from a second client program to deposit content identical to the data item;
  assigning an expiration time to the data item by the processors at each of the plurality of storage sites;
  reacting to a request from the second client program to delete the data item from the data repository, the reacting step comprising:
    receiving the request by the processors at each of the plurality of storage sites;
  separately comparing, on a processor at each of the plurality of storage sites, the expiration time assigned to the data item at the storage site with a current time value; and
  deleting the data item from the storage site if the expiration time has passed, and not deleting the data item if the expiration time has not yet passed;
  wherein the expiration time assigned by the processors at each of the plurality of storage sites defines the end of a finite time interval during which the processor at the storage site does not allow the second client program to delete the data item and does not allow the second client program to change the expiration time to an earlier time, but does allow the second client program to change the expiration time to a later time.

2. The data storage system of claim 1 in which the expiration time assigned to the data item by a processor at a storage site depends upon a plurality of expiration times assigned by the plurality of client programs.

3. The data storage system of claim 1 further comprising encrypting the data item using a key derived from the content of the data item.

4. The data storage system of claim 1 wherein the ensuring step further comprises:

comparing the digital fingerprint with digital fingerprints of data items already stored on storage hardware in the data repository; and
  storing the data item on storage hardware in the data repository if comparing establishes that the data item is not already stored there, and not storing the data item on the storage hardware in the data repository if comparing establishes that the data item is already stored there.

5. The data storage system of claim 2 in which the expiration time assigned to the data item by the processor at the storage site is the latest of all of the plurality of expiration times assigned by the plurality of client programs.

6. The data storage system of claim 1 in which the hash function is a cryptographic hash function.

7. The data storage system of claim 1 in which the storing step further comprises:
  selecting at least one of a plurality of storage devices at each of the plurality of storage sites of the data repository, with the selection based at least in part on the digital fingerprint; and
  storing the data item on the selected storage devices.

8. The data storage system of claim 1 in which the second client program specifies an expiration time for the data item and the specified expiration time is assigned to the data item by the processors at each of the plurality of storage sites.

9. The data storage system of claim 1 in which the plurality of client programs can extend the expiration time assigned by the processor at a storage site but no action taken by any of the plurality of client programs can cause the expiration time to be changed to an earlier time or cause the stored data item to be deleted from the storage site at an earlier time than the expiration time.

10. The data storage system of claim 1 in which the data item has been assigned a permanent status that indicates that it will never expire and the data repository should never delete the data item.

11. The data storage system of claim 1 in which a set of rules governing the assignment of an expiration time to the data item are communicated to the processors at the plurality of storage sites.

12. The data storage system of claim 7 in which at least part of the digital fingerprint is used as a source of pseudo-randomness in the selecting step.

13. The data storage system of claim 1 in which two of the plurality of storage sites are located in different cities.

14. The data storage system of claim 7 in which the selected storage devices comprise magnetic disks.

15. The data storage system of claim 11 in which a one of the set of rules depends, at least in part, on the time at which a storage system client makes a request that causes the expiration time to be assigned.

16. The data storage system of claim 1 in which the first client program transmits the data item over the network to the processor that is a part of a one of the plurality of storage sites, and that storage site communicates redundant information about the content of the data item to others of the plurality of storage sites.

17. The data storage system of claim 1 in which fault tolerance against the loss of a storage site is achieved using redundancy.

18. The data storage system of claim 1 wherein software running on the processors at the plurality of storage sites protects the data item from premature deletion from the data repository even if the correct operation of the data repository is maliciously subverted at a one of the plurality of storage sites.

19. The data storage system of claim 18 wherein policies governing the operation of the data repository require that an entity that has administrative authority or physical access at a one of the plurality of storage sites is not granted special privileges or physical access that would allow the entity to globally circumvent rules governing how long the data item must be retained in the plurality of storage sites.

20. The data storage system of claim 19 in which the entity is an ordinary operator or an ordinary administrator of the data repository.

21. The data storage system of claim 1 in which the second client program communicates over the network with a server of the data repository using a defined storage protocol that makes use of the digital fingerprint.

22. The data storage system of claim 21 in which the use of digital fingerprints reduces the amount of bandwidth required for depositing data items.

23. The data storage system of claim 21 in which the digital fingerprint is used to verify the integrity of the content of the data item.

24. The data storage system of claim 1 wherein, even after the expiration time has passed, the data item is retained at the plurality of storage sites until a new request to delete the data item is initiated by one of the plurality of client programs that share space used to store the data item in the data repository, and communicated to the processors at each of the plurality of storage sites.

* * * * *